April 2, 1940.  W. T. ELLIS  2,195,697
THERMAL CONTROL FOR COOLING SYSTEM
Filed March 30, 1938  2 Sheets-Sheet 1
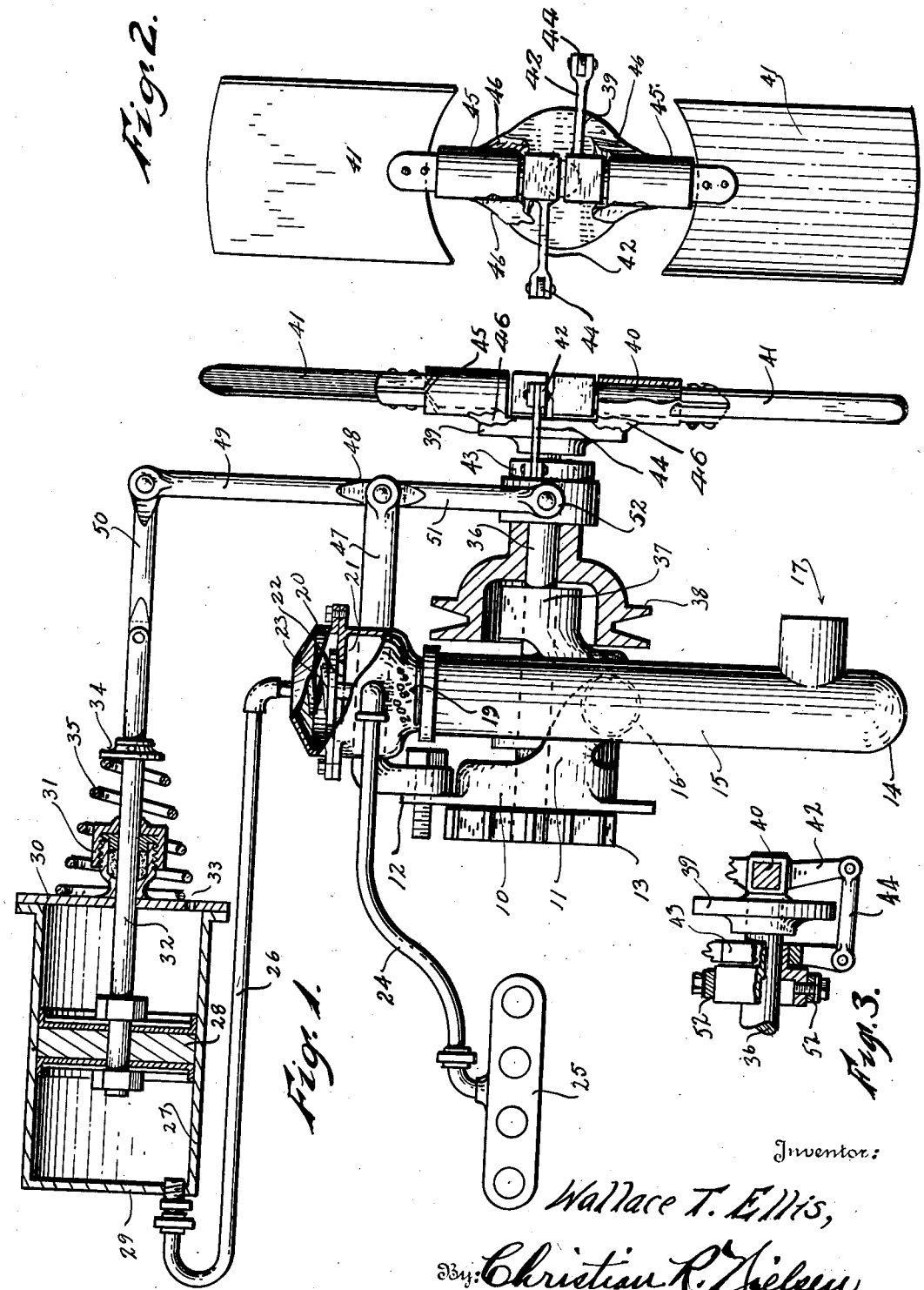
Inventor:
Wallace T. Ellis,
By: Christian R. Nielsen.
Attorney

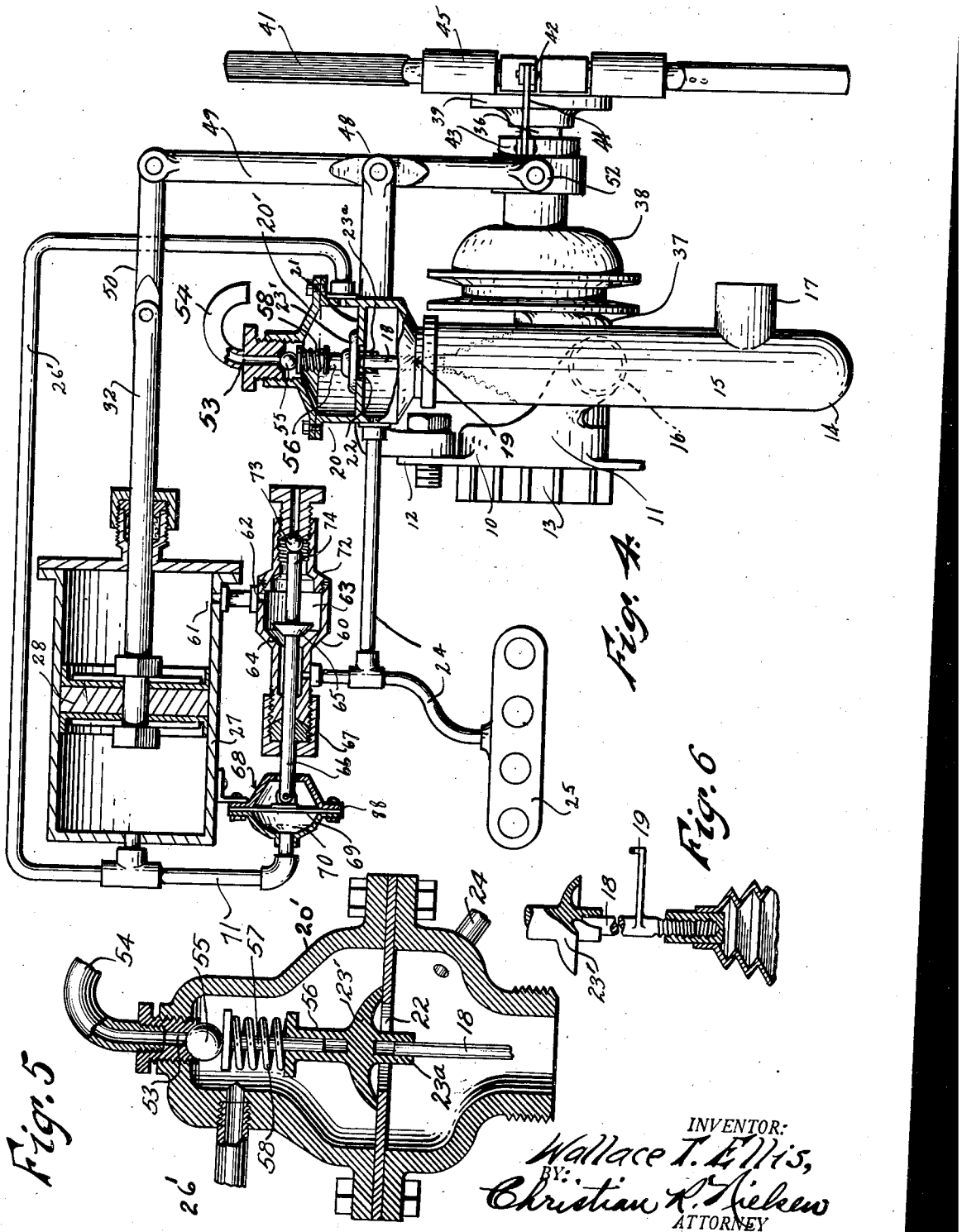

Patented Apr. 2, 1940

2,195,697

UNITED STATES PATENT OFFICE 2,195,697

THERMAL CONTROL FOR COOLING SYSTEM

Wallace T. Ellis, Angleton, Tex.

Application March 30, 1938, Serial No. 199,003

2 Claims. (Cl. 123—171)

The invention relates to thermal controls for heating and cooling systems and the like, and while capable of general application in various situations, such as heating and ventilating of houses, refrigeration systems, automobile ventilation and internal combustion engine temperature regulation, in the present instance it is shown as especially adapted to use in regulating the temperature of an internal combustion motor, especially such as are used in automobiles.

The invention seeks to provide a system which is specially useful in motor vehicles in frigid climates, in order to regulate the cooling of the internal combustion motor, yet avoiding freez15 ing of the water in the heat radiator through which water from the motor cylinder jackets is circulated. It is an objection to some of the simple thermal circulation controls that they operate by restriction of flow to the radiator, and when the motor is cold, and the vehicle is driven in air at low temperatures, the water is frozen in the radiator before the motor has warmed up, and thereafter proper cooling can not be effected by circulation through the radiator.

It is an aim to present a device readily adapted to installation on conventional motors without modification of design of the motors or other parts of a motor vehicle, except by the installa30 tion by attachment with regular assembly bolts of the motor of my fan and control unit, the conventional fixed blade fan being discarded but the original fan shaft utilized.

Another aim is to provide such a device which will be thoroughly automatic and dependable in operation, and reasonable in cost.

Another aim is to provide such a device which will be thoroughly automatic and dependable in operation, and reasonable in cost.

Additional objects, advantages and features of invention reside in the construction, arrangement and combination of parts involved in the embodiment of the invention as will appear from the following description and accompanying drawings, wherein Figure 1 is an elevation, partly schematic, and partly in section, representing one embodiment of the invention.

Figure 2 is a front view of the fan.

Figure 3 is a sectional view on the plane above the fan shaft, looking downward.

Figure 4 is a view similar to Figure 1 of a modification.

Figure 5 is a sectional view of a further modified form of the device.

Figure 6 is an enlarged detail of the thermostat adjusting means.

There is illustrated a conventional pump 10, such as is installed on the cylinder block of an internal combustion motor of an automobile, and provided with the usual nipple 11 by which a hose from the radiator is ordinarily connected to the pump. The pump is one which bolts as at 12 directly to the face of the cylinder block, the impeller 13 of the pump customarily being exposed through an opening in the cylinder block by which water may pass to or from the pump.

A thermostat 14 is shown of a conventional form well known on the open market, and consisting of a conduit 15 having a lower hose nipple 17 and an upper hose nipple 16 the latter connected to the nipple 11 of the pump. Within the case 15 is any usual means (not illustrated here) by which a rod 18 projected from the upper end of the case (see Fig. 4) is moved in response to changes of temperature of water passing through the case, the rod being moved upwardly in the present instance when the temperature passes below a predetermined degree. The device customarily includes a regulating means including a pointer 19 on the side of the device, associated with a scale of degrees marked on a suitable surface of the thermostat, by which it may be set to operate the rod to a desired distance at a given degree of heat in the water passing through the device.

A chamber 20 is mounted on the upper end of the case 15, having a horizontal partition 21 therein ported centrally at 22, and having a poppet valve 23 normally seated thereon at the upper side over the port, the stem of the valve projecting downwardly through the port and alined with the rod 18 so as to be engaged by the latter to lift the valve when the rod is moved upward a sufficient distance. If desired, a lost motion telescopic connection 23—a with the rod may be included.

A conduit 24 connects the lower part of the chamber with the inlet manifold 25 in a substantial vacuum or vacuous condition exists in normal operation of present day motors of this kind.

From the upper side of the chamber in Figure 1, a conduit 26 is extended into communication with the left-hand end of a cylinder 27, in which a piston 28 is reciprocable suitably constructed to oppose passage or escape of air past the piston from one end of the cylinder to the other. At its end where the conduit 26 enters, the cylinder is closed by a permanent head 29, while at the opposite end a removable head 30 is provided having a packing joint 31 centrally thereof through which the piston rod 32 is reciprocable, the inner end of which is connected to the piston. The head 30 is provided with a vent 33. On the rod 32 a distance outwardly of the head 30, a collar 34 is fixed on the rod, confining a pyramidal helical spring 35 seated against the head 30, and serving to move the rod and piston to the right-hand limit of their movement, yieldable to atmospheric pressure on the piston when air is sufficiently exhausted from the left-hand end of the cylinder.

As is usual in such water pumps as the one illustrated, a combined pump and fan shaft 36 is journalled in an extension 37 of the pump housing, and a pulley 38 is pinned to the shaft 36. On the forward extremity of the shaft 36 a fan hub 39 is secured, on which short radial blade shafts 40 are revolubly mounted in suitable number. It is found that by the use of my invention greater efficiency is obtained from the blades, so that two blades are ordinarily ample. Blades 41 are fixed at the outer ends of the shafts 40, and an operating arm 42 is fixed on each shaft 40 so that the latter may be turned to set the blades at various angles to the plane of rotation of the fan. An operating collar 43 is suitably splined to the shaft from which collar links 44 are extended to the respective arms 42 on the shafts 40. One arm 42 extends upwardly and the other downwardly when the blades are at feathering position (which means a minimum angle to the plane of rotation of the fan. Consequently, movement of the collar 43 will rotate the blades in opposite directions producing the same angle of incidence in each blade. In the present instance, the hub 39 is formed with a flat outer face and bearing sleeves 45 in which the shaft 40 rotates are secured to the face of the hub by welds 46.

A bracket arm 47 is mounted by means of the pump assembly bolt 12, this arm extending over the shaft 36 to a point over the sleeve 43, where a lever 48 is pivoted thereon, having one arm 49 connected with the extremity of the piston rod 32 by a link 50. The lower end of the lever is extended downwardly and has a gambrel connection 52 with the collar 43.

Fans for the uses involved here are ordinarily driven by a V-belt from a motor pulley below (not shown here) and rotate in a clockwise direction as viewed from the front or right in Figure 1. It will thus be seen that as illustrated, rearward movement of the collar 43 will turn the blades so as to produce an angle of incidence with the encountered air that will cause the warm air next to the engine to be propelled forwardly or to the right, and that rearward movement of the sleeve to a sufficient distance will turn the blades oppositely so as to cause a rearward propulsive effect and in the case of a motor and radiator assembly of the kinds familiar, drawing cool air through the radiator. It is contemplated that at low temperatures where there is liability of the radiator freezing, the thermostatic device will function to cause the sleeve 43 to be so moved forwardly, and when the circulating water of such systems is brought to a proper low temperature, the sleeve 43 will be moved sufficiently forward to produce a compensating angle of incidence in the blades 41 which will propel air forwardly or to the right and so involve warming of the radiator with which it may be associated in the conventional way.

In operation, there will be a constant vacuous condition in the conduit 24 and lower part of the chamber 20, but when the water passing through the thermostat device 15 is cool the rod 18 will be projected, opening the valve 23 and allowing exhaust of the cylinder 27. This forces the piston rearwardly, operating the lever 49 so as to move the sleeve 43 forwardly. When the temperature of the water is raised, the thermostatic elements will retract the rod 18 downwardly, allowing the valve 23 to close and permitting the spring 35 to move the piston to the right. This operates the lever 49 so as to force the collar 43 rearwardly, and moving the blades 41 so as to force air rearwardly.

If found necessary to provide an air admission means on the left end of the cylinder 27 to avoid opposing action of the spring 35, a construction such as shown in Figure 4 may be employed. Here the case 20' corresponding to case 20 of Figure 1 is formed with a central atmospheric port 53 in its upper side, in which a goose-neck pipe 54 is engaged to prevent ingress of water and dirt, and at the lower side of which there is normally and yieldingly seated a ball valve 55, as will be explained. The conduit 26' enters the side of the upper part of the chamber, and the conduit 24 is connected to the lower chamber as before.

The valve 23' is seated as was the valve 23 over the port 22 in partition 21. The casing 20' is formed in two parts, flanged and bolted together. The thermostat may be as before indicated, and its rod 18 is engaged slidably in a depending tubular stem portion 23—a comprising a telescoping lost-motion connection between the rod and the valve, so that the valve is not lifted until a predetermined degree of movement of the rod has occurred, the limit regulated by the adjusting device 19 as before mentioned. The valve has an upwardly extending coaxial tubular stem 56 receiving slidably therein a depending stem 57 of the ball valve 55. A light spring 58 is confined between the valve 55 and the upper end of the stem 56, so that when the valve 23' is closed, the valve 55 may act as a check valve allowing ingress of air to relieve the vacuous condition in the cylinder 27 sufficiently to permit the spring 35 to operate the piston.

In the last described construction, when the temperature of the water lowers sufficiently the rod 18 is projected upward, opening the valve 23' and compressing the spring 58, so that the suction within the chamber will not cause entry of air, but will operate the piston 28. The spring 58 may be so graduated that slight compression will cause rapid increase of stress therein, or it may clear the valve 55 and allow the valve 55 to open by gravity when the valve 23' is closed.

In Figure 4 the construction includes a modification in which means is provided whereby the piston 28 will be moved in both directions as required by atmospheric pressure in a barometric chamber device, and the spring 35 before described eliminated.

In this instance the construction may be the same as before described, including the features of Figure 5, with certain features added. The pipe 26 before mentioned has an equivalent in the pipe 26', and the construction of the pump, thermostatic valve, and fan elements and connections may be the same as heretofore set forth.

A valve casing 60 is shown in Figure 4, having communication at 61 with the right hand end of the cylinder 27 through a lateral port 62 opening from the enlarged chamber 63 in the casing 60.

The inner or left hand side of this chamber includes a reduced part forming a conical seat 64 on a horizontal axis upon which a poppet valve 65 is arranged to seat having a stem 66 projected therefrom through the reduced part of the casing and through a packing 67 to a diaphragm valve device 68 thereadjacent. The stem 66 is connected to the diaphragm 69 of this valve so that movement of the diaphragm will move the valve to a closed position. A sealed chamber 70 is formed at the opposite side of the diaphragm, connected with the left-hand end of the cylinder 27 by duct 71. The right hand end of the chamber 63 is closed by a cap 72 having a check valve 73 mounted therein engaged by a stem 74 from the valve 65 to operate in relation to the valve 65 in the same way as the ball valve 55 in relation to the valve 23', except that no spring is interposed between the valve stem and valve, as in the first instance, although this is discretionary. The operation of this device is such that the valve 65 is either at full open position, when its stem 74 presses the valve 73 to its seat, preventing ingress of air from the atmosphere, or in full closed position, when the stem 74 permits the valve 73 to open and admit air to the right hand end of the cylinder 27.

A lateral duct opens through the reduced left hand end portion of the case 60, communicating with the inlet manifold through the pipe 24 leading from the manifold to the lower chamber of the case 20.

When the water passing through the thermostat is cold, the valve 23' is open, as before explained, and the exhaust effect of the manifold 25 is communicated to the pipe 26'. The valve 65 will close and the air in the left-hand end of the cylinder 27 will be exhausted, atmospheric pressure admitted by valve 73 at the opposite side moving the piston to the left. This moves the fan to position feathering or propelling air forwardly. When the thermostat responds to higher temperature of the water, and the valve 23' is closed, the valve 55 yields and the valve 65 is permitted to open, seating valve 73 by reason of the action of the diaphragm 69, and air is exhausted from the right-end of the cylinder 27, and moving the fan blades to such position as to draw air rearwardly with resulting cooling effect on the water system of the motor on which the invention is installed.

In the movement of the rod 18 from either extreme of its movement, there comes a time when the valve 23' is very slightly open, and at this position, a slight opening of the valve 65 will result in a partial operation of the piston 28, so that the movement of the fan blades will not be carried to an extreme. The device may be adjusted so that the blades will be brought to such an angle as to maintain the temperature of the motor cooling system at a desired degree most suitable for operation in accordance with the wishes of the operator.

While I have disclosed a specific construction in the devices set forth representing the invention, I do not regard the invention as limited to the exact structure shown and described, and various changes in construction and arrangement may be made without departing from the spirit of the invention as more particularly set forth in the appended claims.

It will be appreciated that essentially the manifold and the ducts therefrom as shown comprise a means for creating differentials in air pressure, and that the cylinder and piston constitute a servo-motor; the thermostat and valves being a control therefor.

I claim:

1. In a control system of the character described, a servo motor consisting of a cylinder, a piston therein, an air exhaust device, duct connections between said air exhaust and each end of the cylinder to exhaust air therefrom, an operated member extended from the piston, a thermostatic device including a member movable in response to variations in heat in the thermostatic device, a valve in the duct connection to one end of the cylinder operatively connected to the movable member and closed when the movable member is in position responsive to a given degree of heat and open when the said movable member is in position responsive to a different degree of heat, means to admit air pressure to said last named duct responsive to closure of the said valve, a second duct from the exhaust device to the opposite end of the cylinder, a valve therein, means normally tending to open the last named valve, means to admit air pressure to the second duct when the second named valve is closed, and means responsive to variation of pressure in the first named end of the cylinder to operate and close the valve at lowered pressure in the cylinder.

2. A servo-motor consisting of a cylinder, a piston therein and an operated member connected to the piston, an air device, duct connections between said air device and each end of the cylinder, a thermostatic device including a member movable in response to variations in heat of matter in the thermostatic device, a valve in the duct connection to one end of the cylinder operatively connected to the movable member and closed when the movable member is in position responsive to a given degree of heat and open when the said movable member is in position responsive to a different degree of heat, means to vent said last named duct responsive to closure of the said valve, a second duct from the air device to the opposite end of the cylinder, a valve therein, means normally tending to move the last named valve to one limit, means to admit air pressure to the second duct when the second named valve is closed, and means responsive to variation of pressure in the first named end of the cylinder to operate the second named valve at predetermined pressure in the cylinder.

WALLACE T. ELLIS.